Jan. 10, 1950 H. F. LYONS 2,494,342
CONTROL FOR THE CONDUCTION OF COMBUSTION AIR
Filed May 29, 1946 3 Sheets-Sheet 1

INVENTOR.
HOWARD F. LYONS
BY
*Richard W. Treverton*
ATTORNEY

Jan. 10, 1950          H. F. LYONS          2,494,342

CONTROL FOR THE CONDUCTION OF COMBUSTION AIR

Filed May 29, 1946          3 Sheets-Sheet 2

FIG. 2

INVENTOR.
HOWARD F. LYONS
BY Richard W. Treveton
ATTORNEY

Jan. 10, 1950      H. F. LYONS      2,494,342
CONTROL FOR THE CONDUCTION OF COMBUSTION AIR

Filed May 29, 1946      3 Sheets-Sheet 3

INVENTOR.
HOWARD F. LYONS
BY
Richard W. Treverton
ATTORNEY

Patented Jan. 10, 1950

2,494,342

UNITED STATES PATENT OFFICE 2,494,342

CONTROL FOR THE CONDUCTION OF COMBUSTION AIR

Howard F. Lyons, Columbus, Ohio, assignor to Curtiss-Wright Corporation, a corporation of Delaware Application May 29, 1946, Serial No. 672,964

14 Claims. (Cl. 123—122)

The present invention relates to internal combustion engines and particularly to apparatus for controlling and directing the passage of combustion air to the engines.

In the operation of an engine, especially aircraft engine, various adverse conditions may be encountered which require that the combustion air be treated in different manners before being inducted into the engine proper. For example, in an aircraft engine operating under normal flight conditions, it is desirable to conduct outside air, received by an air scoop or the like from the airstream around the aircraft, directly into the carburetor or other engine air intake passage, in this manner to obtain a ram effect resulting from the high relative velocity of the airstream. When such aircraft is operating in a dust laden atmosphere, as when taking off from an unpaved runway under dry climatic or weather conditions, it is desirable to pass the combustion air through a suitable filter before allowing it to enter the engine proper. Under icing conditions, when moisture in the atmosphere may freeze in carburetor or other air intake passages, it becomes desirable to preheat the combustion air before it enters the engine.

The present invention provides means whereby ram, heated or filtered air in desired proportions as selected by the operator may be passed to the engine. Valve means for this purpose are so arranged that an adequate supply of air is provided to maintain operation in any selected valve position and while the valves are being moved from one position to another. The valve means are also arranged in such manner that the pressure of incoming air on the valve parts does not impose undue resistance to the operator's control movement of them.

The foregoing and other objects and advantages of the invention, including simplicity of construction and light weight, will become apparent from the following description of the typical embodiment shown in the accompanying drawings, wherein:

Fig. 2 is an elevational view on a larger scale of such air control and directing means in the normal operating position thereof;

Figure 1:
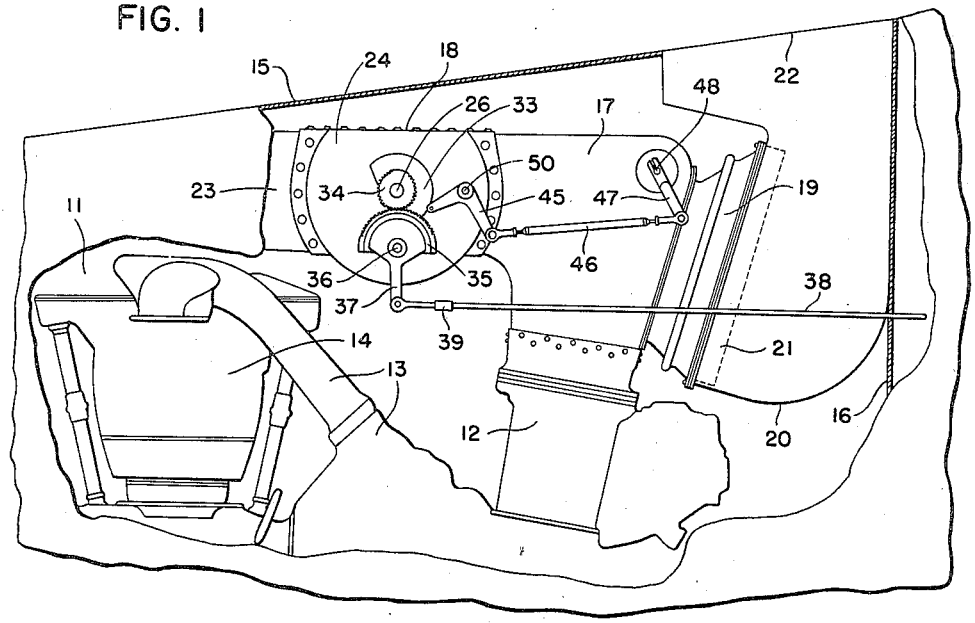
Fig. 1 is a fragmentary side elevational view of an aircraft with portions of the engine cowling broken away to disclose the combustion air control and directing means of the invention.

As shown in Fig. 1 the engine 11 having a carburetor or other air intake section 12, intake manifold 13, and cylinders 14, is enclosed within cowling 15, which together with a fire wall 16 forms a chamber wherein air may be heated by the engine to the temperature above that of the outside air. Secured to the air intake section 12 for conducting combustion air thereto is a conduit 17 having a forward extension to which is connected a valve housing 18, and at the rear wall thereof being connected to a flexible, vibration absorbing duct 19 for passing air from a filter unit 21 which may be secured to the firewall and receives air through a duct 20 which is open to outside atmosphere at the upper side thereof indicated at 22. Connected to the forward end of valve housing 18 is a duct 23 which may open at a forward portion of the aircraft to receive ram air from the outside airstream.

Figure 4:
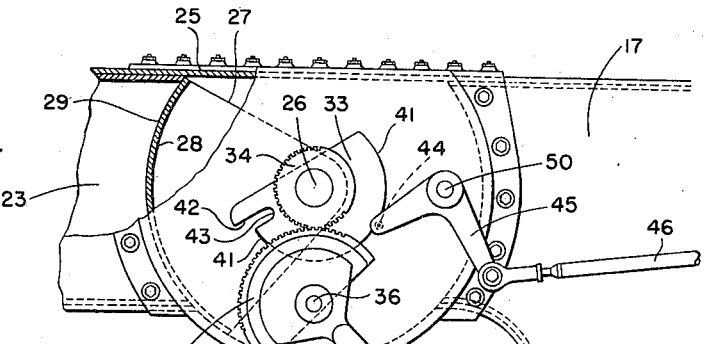
Figs. 3 and 4 are similar views showing certain of the parts in the respective positions thereof when a portion and all of the intake combustion air is preheated.
Figure 6:
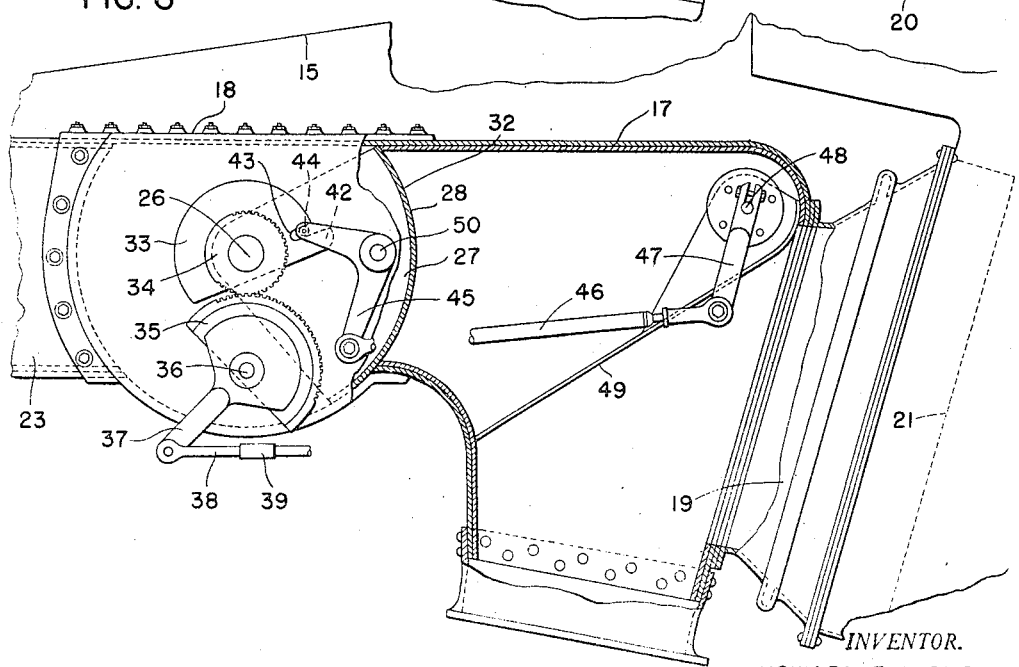

The valve housing 18 comprises spaced side plates 24 connected at their upper edges by a cross-plate 25 and provided with bearing openings for a valve shaft 26. To the shaft between plates 24 are secured arms 27 of a valve whose curved valve face 28 is adapted to close inlet port 29 at the forward end of housing 18, as shown in Fig. 4; or to close the inlet port 31 formed by the opening between side plates 24 at the bottom of housing 18 as shown in Fig. 2; or to close the outlet port 32 from housing 18 into conduit 17 as shown in Fig. 6.

Secured to an outer end of valve shaft 26 are a cam 33 and a pinion 34, the teeth of the latter meshing with a gear section 35 mounted on a pivot post 36 carried by one side plate 24 of the valve housing 18. The sector 35 has an arm 37 connected by a link 38 to suitable control means (not shown) in the pilot's compartment, whereby the valve 28 may be swung to various positions within its housing. The link 38 has interposed at one point along its length a resilient coupling 39 which permits overtravel of the control mechanism in the pilot's compartment and acts to maintain the valve 28 in its extreme positions closing inlet port 29 as in Fig. 4 or closing outlet port 32 as in Fig. 6.

Figure 5:
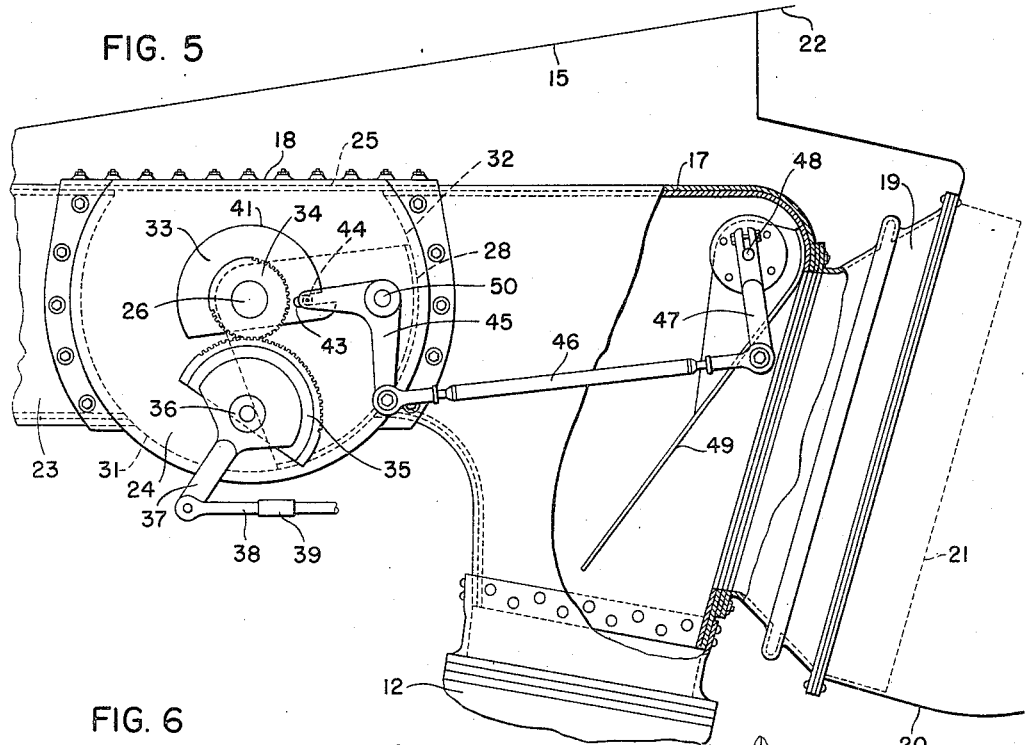
Figs. 5 and 6 are also similar views but showing the parts in the positions thereof when a portion of the combustion air and all of such air, respectively, is filtered.

The cam 33 has a surface 41 concentric with shaft 26, and a radial surface 42 separated from surface 41 by a recess 43. Engageable with these surfaces is a roller 44 carried by a bell crank 45 that is pivoted at 50 to plate 24 and is pivotally connected to one end of a link 46. The opposite end of the latter is pivoted to an arm 47 mounted upon a valve shaft 48 that extends through and is journalled in the side walls of conduit 17. Within the conduit, for closing the opening from the air-filter unit through duct 19, is a gate valve 49 which has arms 51 secured by means 52 to the valve shaft 48. It will be seen that so long as the roller 44 of the bell crank engages surface 41 of the cam, the gate valve 49 will be held closed by link 46 and arm 47 (see Figs. 2, 3 and 4) but that after counterclockwise rotation of the cam to cause the surface 42 thereof to engage the roller, the latter will by and upon continued rotation of the cam be moved into the recess 43 as shown in Figs. 5 and 6, rotating the bell crank clockwise; and through link 46 and arm 47 opening the gate valve.

Figure 3:
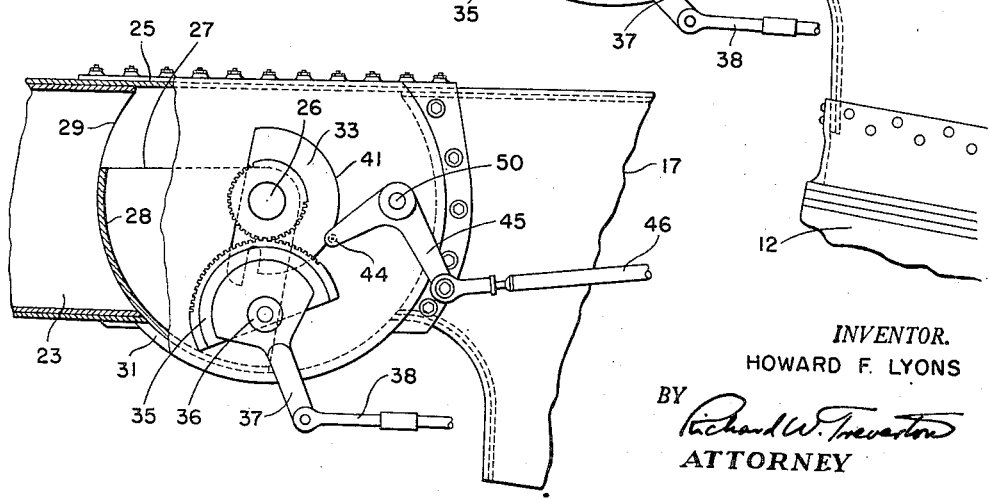

In operation, when ram air is required the control link 38 is brought to the neutral position shown in Figs. 1 and 2. In this position the valve 28 closes inlet port 31 and gate valve 49 closes the opening from the air filter, so that free passage of ram air is allowed through duct 23, inlet and outlet ports 29 and 32 of the valve housing, and conduit 17 into the engine air inlet 12. Should conditions require some preheating of the combustion air, the link 38 is moved to the right, swinging the valve 28 to a position such as shown in Fig. 3. In this condition the valve 49 remains closed, but the air entering the engine will be a mixture of ram air entering from duct 23 through partially open port 29 and air entering from the engine enclosure through partially open inlet port 31. The temperature of the air entering port 31 has been raised by heat dissipated from the engine, so that the combustion air mixture entering the intake 12 will be of considerable higher temperature than that of the outside atmosphere.

In the event atmospheric conditions are such in relation to the fuel-air mixing ratio being employed that all of the entering air should be preheated, the link 38 is moved to the right to its limit position, shown in Fig. 4. This will result in full closure of the inlet port 29 by valve 28, and as gate valve 49 remains closed, all of the air entering the engine will be preheated air entering through the now fully opened inlet port 31. It will be noted that in all positions of the valve 28 between the limit positions shown in Figs. 2 and 4, the inlet area of ports 29 and 31 will remain substantially constant so that at no intermediate valve position will the engine receive insufficient air.

If the engine is being operated in a dust laden atmosphere, the link 38 may be moved to the left to the position shown in Fig. 6. Such action will result in the valve 28 closing the outlet port 32 so that no ram air from duct 23 or preheated air may enter conduit 17, and the gate valve 49 is fully opened so that air entering the filter 21 through duct 20 will, after being filtered, enter into the engine induction system. Since the flow of air is retarded by the filter, the air passages including the opening uncovered by the open gate valve are preferably much larger than the area of any of ports 29, 31 and 32.

It will be noted that the pressure of ram air from duct 23 may tend to resist opening of the gate valve 49 and for this reason the parts are so arranged that port 32 is substantially closed by valve 28 as the gate valve begins to open. An intermediate position of the gate valve shown in Fig. 5 illustrates this feature of the arrangement, which facilitates the pilot's operation of control link 38.

It will be understood that the specific structure and arrangement of parts herein shown and described represent merely a preferred form of the inventive principles involved, and that these principles may be otherwise embodied without departing from the spirit of the invention or the scope of the appended claims.

I claim:

1. In an engine air inlet system having sources of ram air, heater air and filtered air; a conduit leading to an engine air inlet; a first valve for selectively opening the conduit to the ram air source or the heated air source, or for closing the conduit to both the ram air and heated air sources; a second valve for opening or closing the conduit to the filtered air source; and connecting means for opening one valve as the other valve is closed, said connecting means including means for holding the second valve closed while the first valve is moved selectively to open the ram air source or the heated air source to the conduit.

2. In an engine air inlet system having at least three sources of air; a conduit leading to an engine air inlet; a first valve for selectively opening the conduit to either of two of said sources or for closing the conduit to both of said two sources; a second valve for opening or closing the conduit to a third source; and connecting means for opening one valve as the other valve is closed, said connecting means including means for holding the second valve closed in either selected open position of the first valve.

3. In an engine air inlet system having at least three sources of air; a conduit leading to an engine air inlet; valve means for selectively opening the conduit to either of two of said sources or for closing the conduit to both of said two sources, said valve means comprising a valve housing having two inlet ports and an outlet port opening into the conduit, and a valve pivoted to the housing for movement into selected positions closing any one of said ports; a second valve for opening or closing the conduit to a third source; and means for opening and closing the second valve as the first mentioned valve moves toward and from closing relation to said outlet port.

4. In an engine air inlet system having at least three sources of air; a conduit leading to an engine air inlet; a valve housing having two inlet ports for receiving air from two of said sources and an outlet port opening into said conduit, and a valve pivoted to the housing for movement between positions wherein it may close any one of said ports; a second valve for opening and closing the conduit to a third source; and means connecting said valves for retaining the second valve closed as the first mentioned valve moves between positions closing one or the other of said inlet ports, and for opening the second valve as the first valve moves to a position closing said outlet port.

5. In an engine air inlet system having at least three sources of air; a conduit leading to an engine air inlet; a valve housing having two inlet ports for receiving air from two of said sources and an outlet port opening into said conduit, and a valve pivoted to the housing for movement between positions wherein it may close any one of said ports; a second valve for opening and closing the conduit to a third source; and means connecting said valves comprising a cam movable with the first mentioned valve and a member engaging the cam for operating the second valve, said cam restraining the member against movement to open the second valve during movement of the first valve between positions closing either of said inlet ports and effecting movement of the member to open the second valve as the first valve moves to a position closing said outlet port.

6. In an engine air inlet system having at least three sources of air; a conduit leading to an engine air inlet; a valve housing having two inlet ports for receiving air from two of said sources and an outlet port opening into said conduit, and a valve pivoted to the housing for movement between positions wherein it may close any one of said ports; an opening in said conduit to a third source, and a valve for closing the opening pivoted for opening movement into the conduit; and means connecting said valves for opening the second valve as the first valve moves into a position closing said outlet port.

7. In an engine air inlet system having at least three sources of air; a conduit leading to an engine air inlet; a valve housing having two inlet ports for receiving air from two of said sources and an outlet port opening into said conduit, and a valve pivoted to the housing for movement between positions wherein it may close any one of said ports; an opening in said conduit to a third source, and a valve for closing the opening pivoted for opening movement into the conduit; and means connecting said valves for retaining the second valve closed as the first valve moves between positions closing one or the other of said inlet ports, and for opening the second valve as the first valve moves to a position closing said outlet port.

8. In an engine air inlet system having at least three sources of air; a conduit leading to an engine air inlet; a valve housing having two inlet ports for receiving air from two of said sources and an outlet port opening into said conduit, and a valve pivoted to the housing for movement between positions wherein it may close any one of said ports; an opening in said conduit to a third source, and a valve for closing the opening pivoted for opening movement into the conduit; and means connecting said valves comprising a cam movable with the first valve and a member engaging the cam for operating the second valve, said cam restraining the member against movement to open the second valve during movement of the first valve between positions closing either of said inlet ports and effecting movement of the member to open the second valve as the first valve moves to a position closing said outlet port.

9. In an engine air inlet system having sources of ram air, heated air and filtered air; a conduit leading to an engine air inlet; a valve housing having an outlet port opening into one side of the conduit, an inlet port for ram air opening into the side of the housing opposite to the outlet port, and an inlet port for heated air between the first-mentioned two ports; a first valve pivoted in said housing for movement therein to positions covering any one of said ports; the conduit having an opening for receiving filtered air in the opposite side thereof; a second valve for closing said opening pivoted for opening movement into the conduit; and operating means associating said valves for opening the second valve as the first valve moves to a position closing said outlet port.

10. In an engine air inlet system having sources of filtered air and unfiltered air, a conduit leading to an engine air inlet, a valve housing having inlet and outlet ports for unfiltered air, said outlet port opening into one side of the conduit, a first valve in the housing movable toward and from positions closing the outlet port, the conduit having an opening for filtered air in the opposite side thereof, a second valve for closing said opening pivoted for opening movement into the conduit, a cam movable with the first valve and a member engageable with the cam for operating the second valve, said cam and member functioning to open the second valve as the first valve moves to a position closing said outlet port.

11. In an engine air inlet system having at least three sources of air, the combination therewith of: a conduit leading to an engine air inlet; a valve housing having two inlet ports for receiving air from two of said sources and an outlet port opening into said conduit; a first valve pivoted to the housing for movement between positions wherein it may close any one of said ports; an opening in said conduit to a third source; a second valve for said opening pivoted for opening movement into the conduit; and operating means for said valves, said operating means including means for retaining the second valve closed as the first valve is moved between positions closing one or the other of said inlet ports.

12. In an engine air inlet system having at least three sources of air, the combination therewith of: a conduit leading to an engine air inlet; valve means operable to selectively connect either of two sources of air to said conduit or to close both of said two sources from the conduit; a valve for opening or closing the conduit to a third source of air, said valve being arranged for opening movement into the conduit; operating means for said valve means and for said valve, said operating means including means for retaining the valve closed when the valve means opens either of said two sources to the conduit, and to open the valve as the valve means is operated to close both of said two sources from the conduit.

13. In an engine air inlet system having sources of ram air, heated air and filtered air, the combination therewith of: a conduit leading to the engine air inlet; first valve means selectively operable to first or second positions for respectively opening the conduit to the ram air source or to the heated air source, or to a third position for closing the conduit from said ram air and heated air sources; second valve means for opening or closing the conduit to the filtered air source; and operating means for said first and second valve means, said operating means including means for holding the second valve means closed when the first valve means is operated to said first or second positions, and for opening said second valve means when the first valve means is operated to said third position.

14. In an engine air inlet system having plural sources of air, the combination therewith of: a conduit leading to the engine air inlet; first valve means selectively operable between first and second positions wherein the conduit is respectively opened to two different air sources, and to a third position wherein the conduit is closed from said two air sources; second valve means for opening or closing the conduit to a third air source; and operating means for said valve means, said operating means including means for retaining said second valve means closed as the first valve means is operated between said first and second positions, and for opening the second valve means as the first valve means is moved to said third position.

HOWARD F. LYONS.

REFERENCES CITED

The following references are of record in the file of this patent:

UNITED STATES PATENTS

| Number | Name | Date |
|---|---|---|
| 2,103,466 | Klemm et al. | Dec. 28, 1937 |
| 2,336,844 | Buck | Dec. 14, 1943 |
| 2,396,317 | Cutts | Mar. 12, 1946 |